US007124186B2

(12) United States Patent
Piccionelli

(10) Patent No.: US 7,124,186 B2
(45) Date of Patent: Oct. 17, 2006

(54) METHOD FOR COMMUNICATING A LIVE PERFORMANCE AND AN INCENTIVE TO A USER COMPUTER VIA A NETWORK IN REAL TIME IN RESPONSE TO A REQUEST FROM THE USER COMPUTER, WHEREIN A VALUE OF THE INCENTIVE IS DEPENDENT UPON THE DISTANCE BETWEEN A GEOGRAPHIC LOCATION OF THE USER COMPUTER AND A SPECIFIED BUSINESS ESTABLISHMENT

(75) Inventor: Gregory A. Piccionelli, Los Angeles, CA (US)

(73) Assignee: Geocom, Los Angeles, CA (US)

( * ) Notice: Subject to any disclaimer, the term of this patent is extended or adjusted under 35 U.S.C. 154(b) by 636 days.

(21) Appl. No.: 10/067,485

(22) Filed: Feb. 4, 2002

(65) Prior Publication Data
US 2002/0107965 A1 Aug. 8, 2002

Related U.S. Application Data

(60) Provisional application No. 60/266,516, filed on Feb. 5, 2001.

(51) Int. Cl.
*G06F 15/173* (2006.01)

(52) U.S. Cl. ............... 709/225; 709/203; 709/219; 709/229; 705/14

(58) Field of Classification Search ........... 709/203, 709/217, 219, 223, 225, 229, 250; 705/5, 705/14, 16
See application file for complete search history.

(56) References Cited

U.S. PATENT DOCUMENTS

| 5,686,954 | A  | * | 11/1997 | Yoshinobu et al. | 725/43 |
| 5,708,478 | A  | * | 1/1998  | Tognazzini | 348/552 |
| 6,133,909 | A  | * | 10/2000 | Schein et al. | 715/721 |
| 6,377,281 | B1 | * | 4/2002  | Rosenbluth et al. | 715/700 |
| 6,409,599 | B1 | * | 6/2002  | Sprout et al. | 463/31 |
| 6,567,867 | B1 | * | 5/2003  | Saito et al. | 710/58 |
| 6,642,939 | B1 | * | 11/2003 | Vallone et al. | 715/721 |
| 2001/0005831 | A1 | * | 6/2001 | Lewin et al. | 705/5 |
| 2001/0053999 | A1 | * | 12/2001 | Feinberg | 705/14 |
| 2002/0068549 | A1 | * | 6/2002 | Tendler | 455/414 |
| 2003/0036949 | A1 | * | 2/2003 | Kaddeche et al. | 705/14 |
| 2003/0083931 | A1 | * | 5/2003 | Lang | 705/14 |

* cited by examiner

*Primary Examiner*—Saleh Najjar
*Assistant Examiner*—Oanh Duong

(57) ABSTRACT

Embodiments of the present invention are directed to system, method and apparatus for producing and differentially promoting, vending and distributing live entertainment by one or more performers from one or more venues based on the locations of the venue(s) and the potential recipient(s) of the performer(s) performance(s). In embodiments of the present invention, a user computer accesses an interface on a provider computer having a listing of performers and performances. The user selects a desired performer and performance and transmits such request to the provider computer. The performer is notified of such request and a response is transmitted to the user regarding the current availability for performance.

15 Claims, 5 Drawing Sheets

METHOD FOR COMMUNICATING A LIVE PERFORMANCE AND AN INCENTIVE TO A USER COMPUTER VIA A NETWORK IN REAL TIME IN RESPONSE TO A REQUEST FROM THE USER COMPUTER, WHEREIN A VALUE OF THE INCENTIVE IS DEPENDENT UPON THE DISTANCE BETWEEN A GEOGRAPHIC LOCATION OF THE USER COMPUTER AND A SPECIFIED BUSINESS ESTABLISHMENT

RELATED APPLICATIONS

This application claims priority from provisional patent application, Ser. No. 60/266,516, filed on Feb. 5, 2001, entitled "Performance Distribution Method," and is fully incorporated herein by reference.

FIELD OF THE INVENTION

The present invention relates to a method, system and apparatus for producing, vending and distributing entertainment from a live venue.

BACKGROUND OF THE INVENTION

The entertainment industry is a multi-billion dollar industry. In particular, the adult entertainment industry is estimated to comprise a market of greater than $50 billion dollars a year. The gentlemen's club and cabaret industry within the larger adult entertainment industry alone comprises more than $1 billion in revenue each year.

The gentlemen's club and adult cabaret industry has traditionally been subject to a substantial amount of regulation at the local level with respect to the zoning and conditional use permits associated with adult cabaret services. Recently, various court decisions have authorized additional levels of regulation with respect to the performers in adult cabarets and gentlemen's clubs. These regulations include distance requirements from dancers, anti tipping regulations, and the prohibition of contact between performers and patrons. Special types of performances which require close proximity or contact between the performer and the patron have in the past been a substantial source of revenue for the gentlemen's club industry. Thee types of performances have been called "lap dances," "table dances," and other names indicating the type of performance which is performed in close proximity to or in contact with a gentleman's club patron.

Some estimates of revenue from such services have ranged from 30 to 50 percent of the gross revenue generated by adult cabarets and gentlemen's clubs. Recent decisions by courts in the United States, and recent local legislation at the city and/or county level acting to constrict or eliminate such special services have resulted in serious loss of revenue to such clubs.

The Internet and other live area computer networks can provide audio and/or visual transmission of performance information from gentlemen's clubs. Adult entertainment on the Internet through membership sites and other forms of businesses generates in excess of 1 billion dollars a year in revenue for the adult on-line entertainment industry. To date, such entertainment generally comprises access to photographic material through photographic galleries or through e-mail transmission of photographic files access to literary material such as erotic stories, and access to low quality video conferencing wherein audio and video is not synchronized and is severely limited due to bandwidth restrictions over networks such as the Internet.

Recent developments in the availability of broadband connectivity present the opportunity to deliver video conferencing of a higher quality in which audio and video can be synchronized, allowing synchronized performances such as dance performances to be transmitted over the Internet.

A need exists for a method and system for providing access to performances such as dances without implicating local regulations restricting specific types of such performances that require proximity and/or contact with a patron. A need also exists for a method and system to increase patronage at gentlemen's clubs by effectively utilizing wide area computer networks. A need also exists for a method and system incorporating higher quality video conferencing wherein audio and video are synchronized, as is necessary in the transmission of dance and other performances. There is also a need to present high quality adult entertainment in audiovisual format that is of an erotic nature, such as the content that is traditionally seen at gentlemen's clubs and adult cabarets.

Summary

Embodiments of the present invention relate to network communication methods and systems having at least one provider computer and at least one (preferably plural) user computers connected for communication on a network. According to embodiments of the present invention, a user on a user computer is provided with an interface from the provider computer, from which the user may select a performer and request a live performance from the selected performer. The selected performer's availability may be communicated to the user.

Methods and systems according to embodiments of the present invention involve generating electronic data corresponding to a live performance performed by the selected performer, where the live performance is performed in real time, in response to the user's request. The live performance data may be generated by recording the live performance with suitable audio or video systems and the generated data may be transmitted over the network to the user, in further response to the user's request. Because the performance is performed live, in real-time, in response to the user's request, the performance may be tailored to the user's request. For example, the performance may include specific services or performance attributes selected by the user.

In further embodiments, the user may be provided with a menu of performers from which the user may select a performer. In such embodiments, the user's request for a performer may include data identifying or otherwise corresponding to one of the performers in the menu. In yet further embodiments, a user's request may include data corresponding to at least one performer and data corresponding to at least one user-selectable attribute of a performance. In such embodiments, data corresponding to a live performance may be generated by recording a live performance performed by the at least one performer and including the at least one user-selectable performance attribute within the performance, in response to the user's request.

In yet further embodiments, a performer identified in a user's request may be notified of the user's request, for example by providing an electronic or audio message, page or the like. In response to the notification, the performer may provide a performance in a performance recording location at which the performance is recorded, live, for transmission as electronic data to the user over the network.

In yet further embodiments the provider computer receives location information corresponding to the geographic location of the user computer. Then, the provider computer provides the user computer with a communication over the network, the communication comprising an incentive to a user of the user computer to visit a specified business establishment within the vicinity of the geographic location of the user computer, wherein the specified business establishment includes the performance recording location. The incentive value may be dependent upon the relative distance between the geographic location of the user computer and the specified business establishment. For example, the incentive value may increase with distance.

These and other aspects of embodiments of the present invention are described in more detail below.

BRIEF DESCRIPTION OF THE DRAWINGS

The invention may be more readily understood by referring to the accompanying drawings in which.

DETAILED DESCRIPTION OF THE PREFERRED EMBODIMENTS

Figure 1:
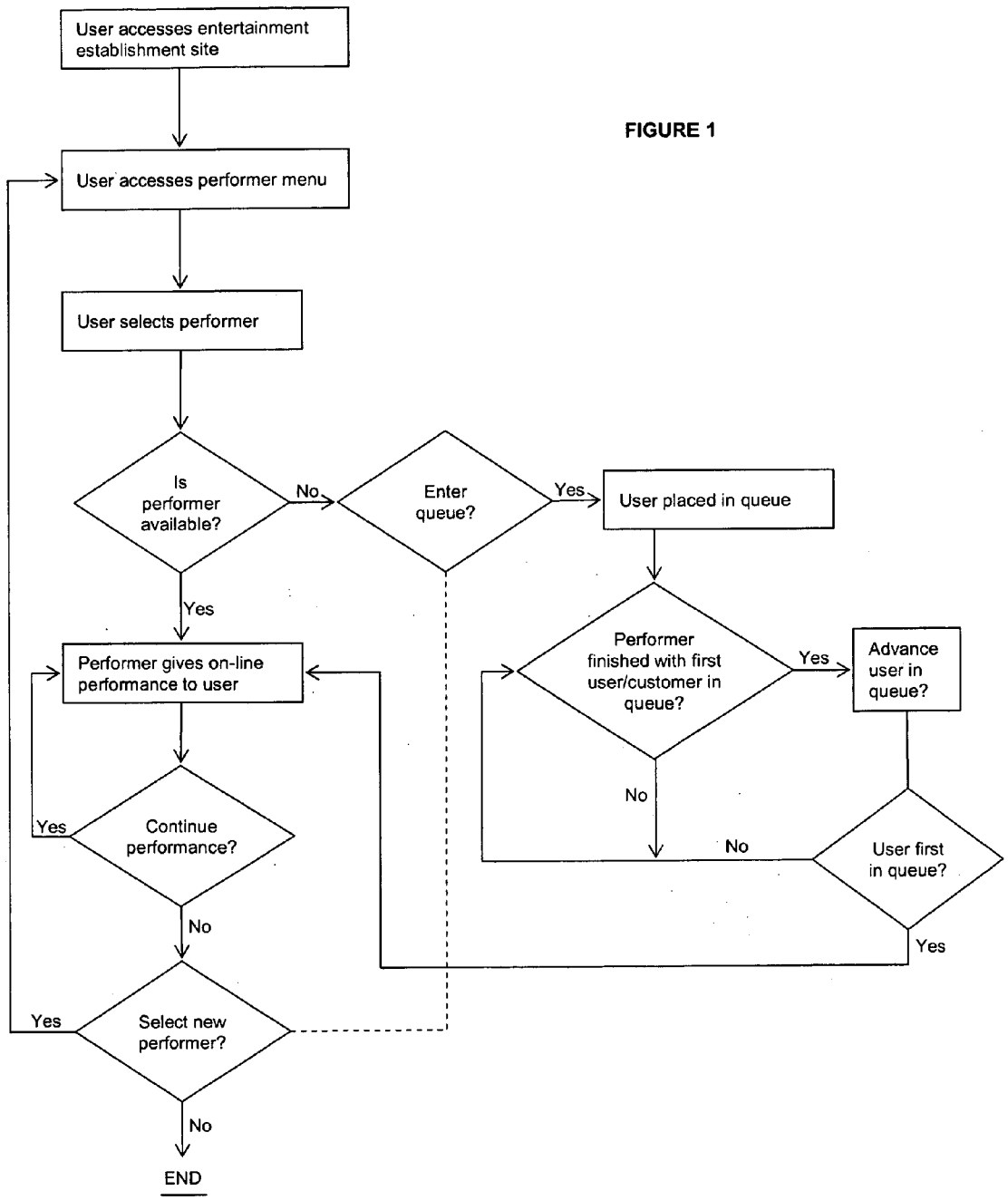
FIG. 1 is a flowchart illustrating a method by which a user is enabled to obtain on-line performances from selected performers.

Turning now to the embodiment illustrated in FIG. 1, a user first accesses a site or other digital portal associated with an entertainment establishment, such as a World Wide Web site, an Internet site or a site on another wide-area or local network. In more specific embodiments, the user accesses the entertainment establishment's site from a remote location, such as the user's home, office or automobile or via a computer, home entertainment system, telephone or mobile computer device such as wireless laptop computer, a personal digital assistant or "PDA" device, such as a Palm Pilot®, or any other digital communication means. In another more specific embodiment, the user accesses the entertainment establishment's site from a computer terminal or mobile computer device on the premises of the entertainment establishment itself.

Once the user accesses the entertainment establishment's site, he next accesses a performer menu provided by the site that lists the performers who are currently present at the entertainment establishment. In some preferred embodiments, indicia of the availability or unavailability of a performer is displayed. In some preferred embodiments, indicia of future, past, conditional and/or special availability and/or unavailability is displayed. In further preferred embodiments, the performer's performance or unavailable status is automatically monitored by the establishment and reported via the provider computer or other means to the user. Methods for automatically monitoring the availability of the performer, include, without limitation, digital transmission of data triggered by activation of a camera or other device used in a performance which directly or indirectly triggers a message, signal, change, or other communication on the site and/or communication to the user indicating the performer's or performers' current, future and/or past availability status. In still further embodiments of the invention, the location of the performer may be dynamically tracked using GPS, card key point check in or other tracking means, whereby the performer's location is used to trigger availability or unavailability. For example. a performers's thumbnail photograph on the establishment's web site may be click disabled or not appear at all when the performer is engaged in a performance or is determined to be located in an area from which performances are not given, e.g. in a rest room, on stage, in a part of the establishment reserved for live private shows. etc.

In more specific embodiments, the performer menu also enables the user to access data files containing information about the performers currently present. Such data files can include, without limitation, text files with background or personal information about the performer, files containing photos of the performer, audio and/or video files featuring the performer, including, without limitation, promotional commercials for the performer and/or the establishment, and the like. In more particular embodiments, the user is enabled to access one or more such files or other files by pointing and clicking on a thumbnail photo of an entertainer. In this manner, the initial interest a user has in a particular performer may be further exploited via the providing of subsequent data which may be directed toward establishing a one-on-one performance by the performer for the user and/or incentivizing the user to patronize the entertainment establishment.

In still further embodiments, the user may access performers engaged in providing other services complimentary to or otherwise related to those traditionally available at gentleman's clubs, including, without limitation, online live gaming with a performer who acts as a dealer, co-gamer or opponent. In still further embodiments of this type, the performer may provide such gaming services as a dealer in black-jack, roulette, craps, baccarat, poker or other game, partially or entirely in the nude. In still further embodiments involving such gaming services, the performer may provide such gaming services associated with a progressive removal or addition of clothing in association with the user's or performer's gaming wins or losses.

At this point, in more specific embodiments, a signal can be provided to the entertainer whose data files have been accessed by the user, alerting the performer of a potential request for a performance. The signal can be provided, for example, through a telephone pager, telephone call, digital assistant or other mobile device, activated by or in conjunction with the entertainment establishment's site, or independently an audio page, a visual display such as an activated light, or any other desired signaling means. Once so notified, the entertainer is enabled, in more specific embodiments, to provide an indication of her availability for performance. For example, if the entertainer is presently engaged in performing or unavailable, she can provide an appropriate signal indicating that she is so engaged or unavailable. Alternatively, a failure to respond within a predetermined time interval can result in generation of a default indication that the performer is engaged in a performance or is otherwise unavailable. If the performer is available for a performance, she can provide another signal indicative of her availability.

In other preferred embodiments, the user may select a plurality of performers for evaluation and/or engagement for further communication and/or performance(s).

In other more specific embodiments, such signals can be provided at a later point, as described below.

Having accessed the performer menu, and optionally viewed one or more performer data files, the user next selects a performer or a plurality of performers from whom the user wishes to obtain a performance and/or series of performances. (All references to a performer should not be construed as a limitation to a single person, or to a person or persons belonging to any particular gender, or exclude non-human performers such as digital actors or synthespians.) This selection can be made in any desired manner, such as by pointing and clicking on a thumbnail photo of the performer or another portion of the menu associated with the desired performer or through the use of voice recognition commands and/or the use of virtual or spacial keyboards or any other suitable digital selection means. In embodiments in which the performer has not previously been notified of the user's interest in obtaining a performance, the performer(s) can be notified at this point, and can then provide an indication of the performer's or performers' availability.

Once the user has selected a performer and the performer and/or the provider computer has responded with the performer's availability status, the menu provides the user with an indication of the performer's availability. If the performer is available, unless already there, the performer then reports to an appropriate location, for example, a room within the entertainment establishment provided with means for video conferencing or other means of transmission of visual, auditory, audiovisual, tactile, smell and/or other sensory information. In some preferred embodiments, the performer may transmit the performance and/or other services via a mobile computer or personal digital assistant capable of transmitting visual, audio, audiovisual, tactile, smell, teledildonic, and/or other sensory information. Preferably at that point, an arrangement is made by which the user provides a payment to the performer and/or the entertainment establishment. In some preferred embodiments the user's age is ascertained and/or verified for the purpose of determining that the user is of the appropriate age to receive sexual and/or other communications only appropriate for adults or persons over a threshold age. Nothing herein is intended to limit the point at which an inquiry, ascertainment, acknowledgment, verification and/or calculation of age and/or age appropriateness is conducted. Any desired means for arranging such payment can be employed by the user, including, without limitation, the use of a credit card, debit card, telephone number, electronic barter method, agreement to extension of credit via digital contract, or other payment means. Alternate means of value exchange, such as registration of the performance with a membership account owned by the user, exchange of frequent flyer miles, and the like, can also be employed.

In any event, the performer then provides the user with an on-line performance or other contracted services. Such performances and/or other contracted services can include, without limitations a dancing performance, a musical performance, a dramatic performance, a comedy performance, instruction, lessons and/or other educational services, gaming, astrological readings, fortune telling, transmission of teledildonic data, virtual sex services, virtual presence services such as remote shopping, remote tourism, and the like. Upon completion of the performance, the user preferably is afforded an option of obtaining one or more additional performances and/or additional services (e.g., transmission of the performer's digital autograph. personalized greeting, etc.) and/or goods (e.g. lingerie, photographs, digital photographs, videos, DVDs, books, music equipment, etc.). and optionally arranging for payment of any additional performances, services and/or goods. In some preferred embodiments, the providing of such additional services may be conditioned upon the performer's and/or establishment's willingness to do so. This is repeated until the user no longer wishes to continue obtaining performances, or until the performer wishes to discontinue performing. In more specific embodiments, at this point the user is afforded the option of returning to the performer menu and requesting a performance from another performer in the same manner as set forth above, or of discontinuing on-line access to the entertainment establishment.

However, if the performer selected by the user is not available, the user, in particular embodiments, is given the option of selecting another performer by returning to the performer menu. In other more specific embodiments, the user is first given the option of being placed in a queue for that particular performer. If the user desires to be placed in the queue, the user's name, pseudonym, code name, code, number, and/or other identification is added to a listing of users and/or customers present at the entertainment establishment who have previously requested a performance from the selected performer, and which includes the user or customer for whom the performer is presently performing. Once the user is placed in the queue, the performer provides inputs indicating whether or not the performer is continuing to perform for the first user or customer. An input from the performer indicating that the performer has completed her performance(s) advances the user within the queue. Once the user is first in the queue, the performer is enabled to provide the user with a performance as soon as the performer is available and/or desires to do so. The user is then enabled to continue obtaining performances from the selected performer or from a different performer, or to end access to the entertainment establishment, in the manner previously set forth above.

In particular embodiments, the performer is enabled to provide a second input by which she selects the position within the queue of one or more users. Thus, for example, the performer can advance regular users or high-paying users within the queue, or move new or less desirable users back within the queue.

In other particular embodiments, the user could be notified of the user's position in the queue, the estimated waiting time, and/or offered incentives to select another performer and/or make payment while waiting, such as through the offering of discounts for the performance, availability of biographic, photographic, videographic and/or audiovideographic data regarding the performer and/or other performers, and/or other goods and/or services. In further embodiments, a user may offer to pay a premium price for the performer's services to advance the user in front of other users ahead of the user in the queue. In still further embodiments, the users may bid for placement in the queue and/or for the services provided by the performer.

Figure 2:
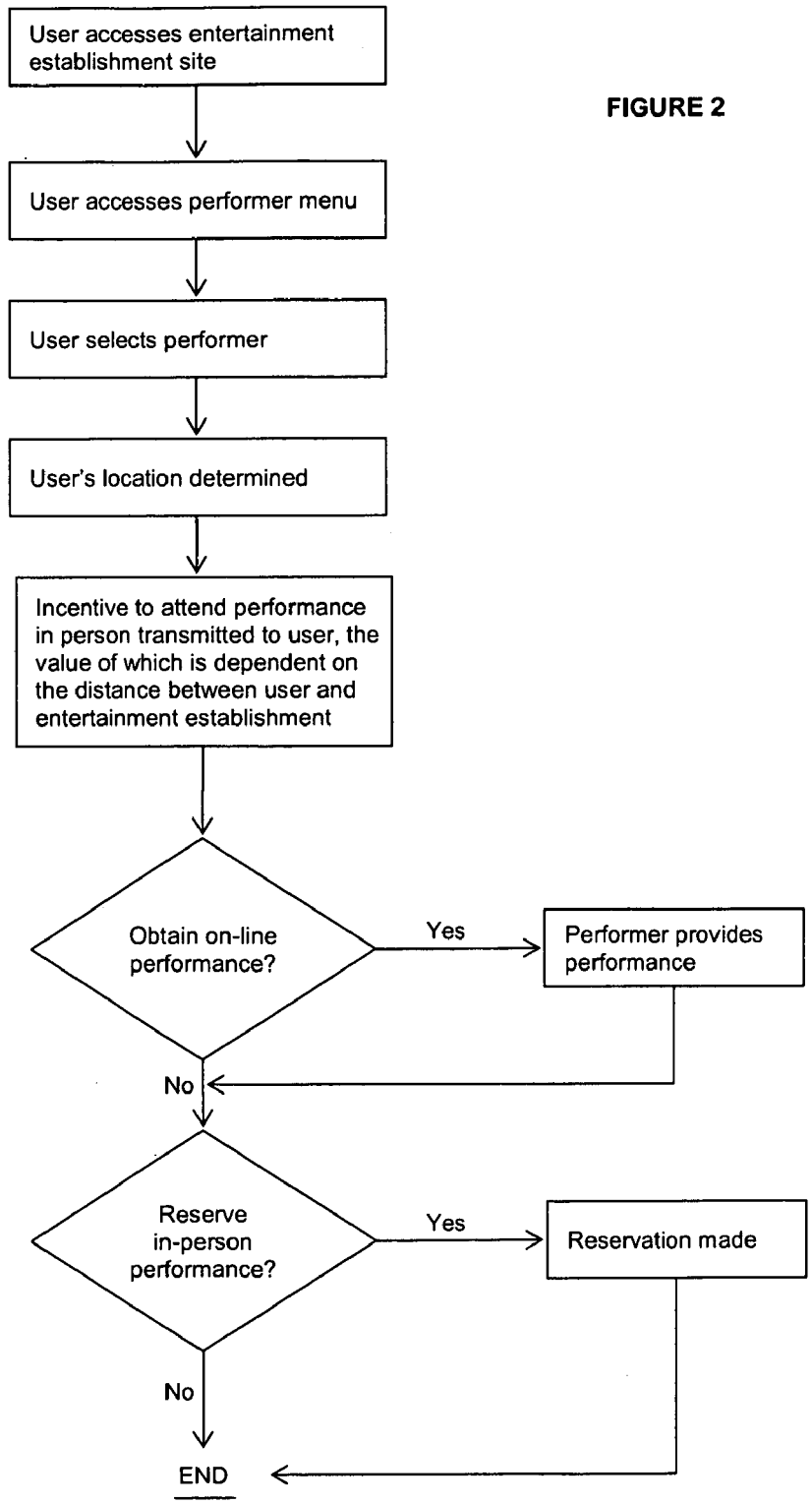
FIG. 2 is a flowchart illustrating an alternative method by which a user is enabled to schedule one or more in-person performances with selected performers at an entertainment establishment, and to obtain incentives to personally patronize the entertainment establishment.

Turning to FIG. 2, a second general embodiment which includes provision of an incentive for a remote user to personally patronize an entertainment establishment and obtain a performance from one or more selected performers includes the initial step, as with FIG. 1, in which a user accesses the entertainment establishment's site from a place, location or site other than the entertainment establishment, e.g. the user's or another's home, office, automobile. etc, a public place and/or a web site other than the establishment's, such as through an affiliate marketing web site. The user accesses the entertainment establishment's performer menu and selects a performer of interest in a manner similar to that set forth above. In this embodiment, however, the physical location of the user, the user's computer, or the user's ISP is next determined. The user's or the user's computer's location can be determined, in particular embodiments, by use of the system disclosed and claimed in U.S. Pat. No. 6,154,172, to Piccionelli et al., or by other means including, without limitation, direct communication between the user and/or the user's computer and the entertainment establishment and/or the provider computer, transmission of the user's location by the user himself by means of an appropriate menu, by disclosure of location by digital certificate, by digital signature and the like, reverse look-up of ISP, use of cellular transponder location, use of data transmitted by smart cards or other digital devices with location sensing, storing and/or transmission capability, use of automobile or other vehicular navigation system location data, inferential and/or deductive calculation of location and/or a combination of the aforementioned and/or other location determination means. Once the user's location has been provided to the entertainment establishment, the entertainment establishment, or alternatively the selected performer, transmits to the user an incentive to the user to patronize the entertainment establishment in person. In particular embodiments, such an incentive can include a discount coupon and/or other devices which are transmitted to and downloaded by the user or are otherwise made available by digital means to the user, an offer of one or more future on-line performances at a discount or without charge, a membership in the entertainment establishment for a predetermined time, and the like.

In more specific embodiments, the distance between the user's location and the entertainment establishment is determined, and the value of the incentive is dependent on that distance between the two or the relative difficulty or cost of the user's traveling to the establishment, for example, when the user is within walking distance of the entertainment establishment, the incentive can be a down loadable coupon good for reduced or free admission to the entertainment establishment when presented in person by the user. When the user is within a short driving distance, such as 30 minutes, the incentive may be increased, for example to include both free admission and one or more free performances by the selected performer (or one or more other performers). When the user is more remote from the entertainment establishment, such as 1–2 hours' driving time, the incentive can be further increased to include a membership in the entertainment establishment that affords the user free admission and a preselected number of free performances over a specified period of time, such as free admission and two free performances per day valid over a 30-day period. Other incentives having different values and different relationships to the distance between the user and the entertainment establishment still be readily apparent and are considered to be within the scope of this invention.

The foregoing embodiment can also be combined with the embodiment illustrated in FIG. 1. That is, a user can both obtain one or more on-line performances and obtain an incentive to visit the entertainment establishment in person.

Furthermore, more specific embodiments afford the user the option of making a reservation with the selected performer. That is, the user and the performer agree upon a time at which the user will patronize the entertainment establishment and/or obtain one or more performances in person or via digital transmission of performances over a wide area computer network.

In addition, the entertainment establishment is enabled, in particular embodiments, to create a listing of some or all users who have obtained on-line or in-person performances. Such a listing can be used, for example, as an e-mailing list to transmit promotional materials, incentives, etc. to the users on the listing.

Figure 3:
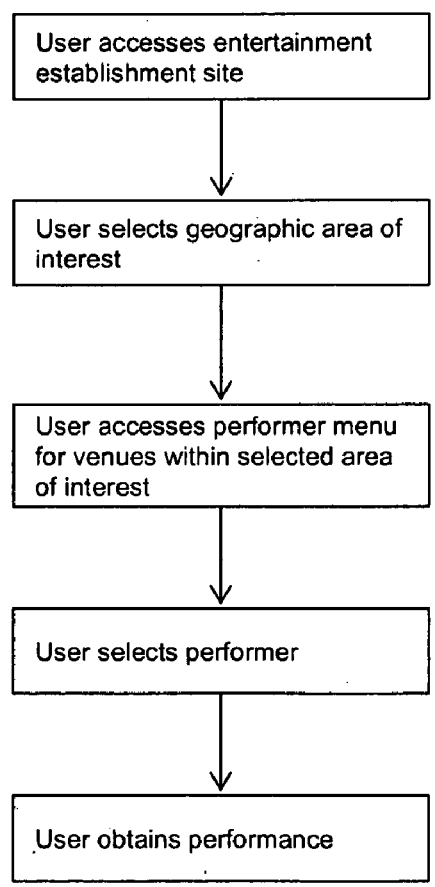
FIG. 3 is a flowchart illustrating an alternative embodiment in which a user is enabled to obtain on-line and/or in-person performances from performers associated with a plurality of associated entertainment establishments in a geographic area of interest to the user.

The foregoing embodiments can readily be generalized to apply to a plurality of associated entertainment establishments, for example, chains of entertainment establishments, networks of affiliates and the like. With reference to FIG. 3, a user initially accesses a site associated with an entertainment enterprise having a plurality of establishments (franchises, associates, licensee establishments, etc.). The user next selects a geographic area of interest, such as international, state, city, locality, zip code, or other geographically defined area. Once the geographic area of interest is selected, the user is provided with a performer menu which lists those performers that are currently present at, or in alternative embodiments employed by, those entertainment establishments within the selected area. The user then selects one or more performers from whom the user desires a performance, in a manner similar to that described previously. Such performances can be on-line, in-person or a combination thereof, as described above.

In other particular embodiments of the invention, the user may receive audio, video, audiovideo, tactile, teledilonic and/or other sensory messages via a wireless mobile computer such as personal digital assistant, mobile internet device, such as a wide area network enabled automobile radio or other similar device, or directly to a vehicle's instrumentation system, transmitted by the establishment and/or one or more performers via a wide area computer network, such as the Internet or via broadcast means, including, without limitation, short range radio transmission, such as from a radio transmitter located in the establishment, a radio transmitter associated with billboard sign, or a mobile transmitter in a second vehicle, etc. In such embodiments, the messages received by the user may be subject to screening and/or filtration to be geared to the location of a particular establishment, e.g., a particular DejaVu® gentleman's club in Las Vegas, any establishment in a chain, e.g. any Deja Vu® establishment regardless of location, an affiliated establishment. e.g., a particular casino affiliated with a gentleman's club, a general type of establishment, e.g, any gentleman's club transmitting such advertisements, or a specific performer on the basis of the performer's current or future location. Such advertising messages could be varied in accordance with and corresponding to distance and/or difficulty and/or cost of access to the establishment and/or performer. The content, tone and explicitness of the messages may be selected by the user, the establishment and/or the performer to be appropriate for an adult user, an adult user with a minor present, the community standards of the location of the user(s), the level of sexual explicitness, for example, by a means of rating analogous to the film rating system established by the Motion Picture Association of America (G, PG, PG-13, NC-17, R, NR) or by X or non-X rating, registration of the user, the user's computer or the user's vehicle on a list to which a transmission of the promotional communication message is entirely or partially blocked or to which sexual communications of a selected level of explicitness is prevented, or any similar restriction or filtration means.

Exotic dancers generally do not perform at a club with any regularity and frequently change the establishments at which they perform. There has been a long felt need in the exotic dancing industry to provide an effective means for patrons to locate establishments to which performers with whom the patrons have previously purchased services in the past, have relocated. In other preferred embodiments, the user may ascertain the location(s) of where one or more user-specified performers are currently performing or are scheduled to perform in the future. In such preferred embodiments of the invention, the performers register their name(s), pseudonyms, code names, numbers and/or other identification and performance location(s) with the establishment, provider computer and/or the central computer. Alternatively, or in addition, the performers may also arrange to have data from tracking and/or other locational devices, including, without limitation, those employing GPS, cell phone location assessment technology, and other location determination means, associated with the performer's and/or the performer's performance location(s), transmitted on a periodic, intermittent or constant basis to the establishment, provider computer, central computer or other computer networked to or affiliated with the establishment, provider computer, central computer and made available to the user a preference for the providing of performances alone or in association with other preferences such as geographic area of interest and/or cost, etc.

For example, a traveling user can notify the provider computer that he desires to receive information, including current, past or future performance location information, regarding a particular dancer, band, comedian or other performer. The user can limit the information in any suitable manner, including, but not limited to, a specific geographic region, including, without limitation, a user-specified region around the user's location (which may be determined by GPS or other locational means), time, types of establishments, cost, etc., and/or any combinations thereof. Upon receipt of the request, the provider computer reviews its database and provides the relevant information, if any, regarding particular performer(s), to the user. Next the user may signal performer(s) to arrange a performance for performances, and/or signal the establishment, at which the performer is or is scheduled to be available, for promotional communications from the performer or others as described herein.

The following example illustrates another preferred embodiment. A user, driving on a highway in an automobile equipped with a device or a plurality of devices capable of determining the current location of the automobile, such as by use of the Global Positioning Satellite System, or cellular telephone transponder location, and further capable of sending and receiving wireless transmission of data, including said device's or devices' means of identification for communication, such as an ISP number, of similar means, via a wide area computer network, transmits digital authorization to receive communications from gentleman's clubs, the current location of the user's automobile and the user's device's or devices' communication identification information. Said user information is stored on a server or similar device and is accessed by a second computer controlled by Gentleman's Club X an establishment authorized to access such information. Said second computer compares the location of user's automobile to the location of Gentleman's Club X and determines that the user's automobile is within a predetermined range of Gentleman's Club X to trigger the transmission of promotional data to the user. Said second computer next transmits an audio advertisement directed to user's said device Whereby the user is informed that Gentleman's Club X is in the user's vicinity.

In further preferred embodiments, the communication transmitted by the second computer may be audiovisual, visual, tactile, olfactory or any combination thereof. In further preferred embodiments, directions to the establishment and/or performer may be transmitted to the user's device, including, without limitation, to a user's automobile navigational device. In still further embodiments, the user's device transmits a pin number or other data evincing the age appropriateness, such as age of majority, of the user and the selection of type and/or prohibition of transmission of data, in whole or in part, by the second computer may be conditioned upon such user age data.

In still further embodiments, the second computer sends a signal to a performer's computer or similar device, notifying the performer of a user in the vicinity of the establishment and/or the performer. In response the performer transmits data, such as audio, video, audiovideo, tactile and/or other sensory data to the user to induce the user to purchase a performance from the performer and/or patronize the establishment. In further embodiments, the performer may receive updated data regarding the user's location and thereby use said updated data in the formulation, selection and/or communication of different enticements, prices of performance, price of entry to the establishment, and/or other perquisites to the user, in accordance with the user's distance from the establishment and/or the performer. Said enticements, may be live communications, photographs, audio, video and/or audiovisual recordings, tactile information, scents and other communications capable of digital transmission.

In further embodiments, wherein the user may elect not to patronize the establishment in person, or before or after such patronage, the user may select via a selection means, to engage a performance by a performer or plurality of performers via user's mobile computer device or arrange for a later performance transmitted to said device or another device.

In still other preferred embodiments, transmissions of communications, promotions and performances could be disabled when a passenger to whom such transmissions would be inappropriate (e.g. a child), is present. For example, in some preferred embodiments, the transmissions could be automatically cut off in response to the detection of a passenger by a passenger detection means, such as one or more sensors in passenger seats triggered by the weight of a seated passenger thereupon, infrared or other radiation detection means, and/or engagement of a passenger safety belt.

Figure 4:
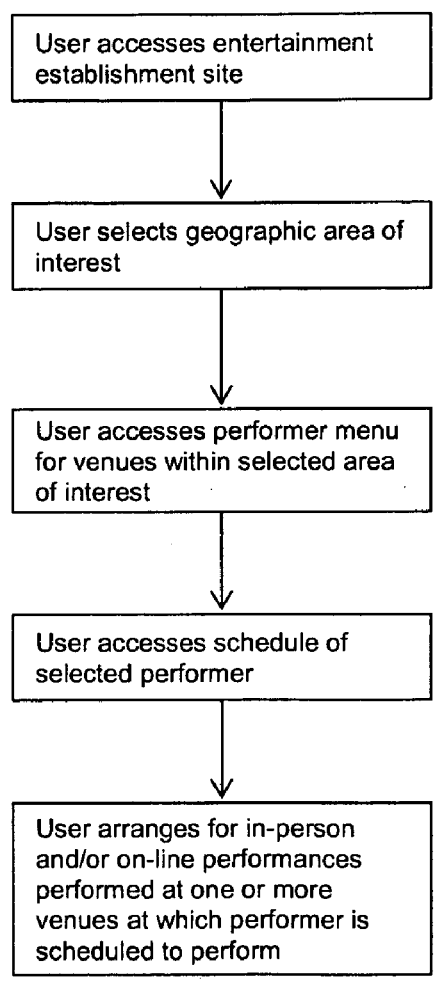
FIG. 4 is a flowchart illustrating an alternative embodiment in which a user is enabled to schedule a plurality of on-line and/or in-person performances from a performer to be performed at different entertainment establishments over a period of time.

According to an alternative embodiment illustrated in FIG. 4, once the user selects a performer of interest, he is enabled to view a schedule of performance times and venues for that performer. Such a schedule can include, for example, a calendar indicating that the performer will appear at a first entertainment establishment for one week, a second entertainment establishment during a second week subsequent to the first week, etc. Once the user has examined the performer's schedule, he is enabled then to arrange for on-line and/or in-person performances at agreed times, the performances originating from one or more entertainment establishments at which the performer will be present at specified dates.

It is to be understood that in alternative embodiments the above described invention could include a network of a plurality of provider computers, wherein each provider computer is associated with one or more establishments and/or performers, including, without limitation, performers who are at locations other than the establishment, such as their home, office, vehicle or other location, the provider computers being coupled to or in communication with a central server. The central server receives, processes and distributes information to the individual provider computers regarding users, including, without limitation, user computer location on a dynamic basis, data required for establishment of communication with user, user preferences, and/or user mobile computer navigation capabilities.

Figure 5:
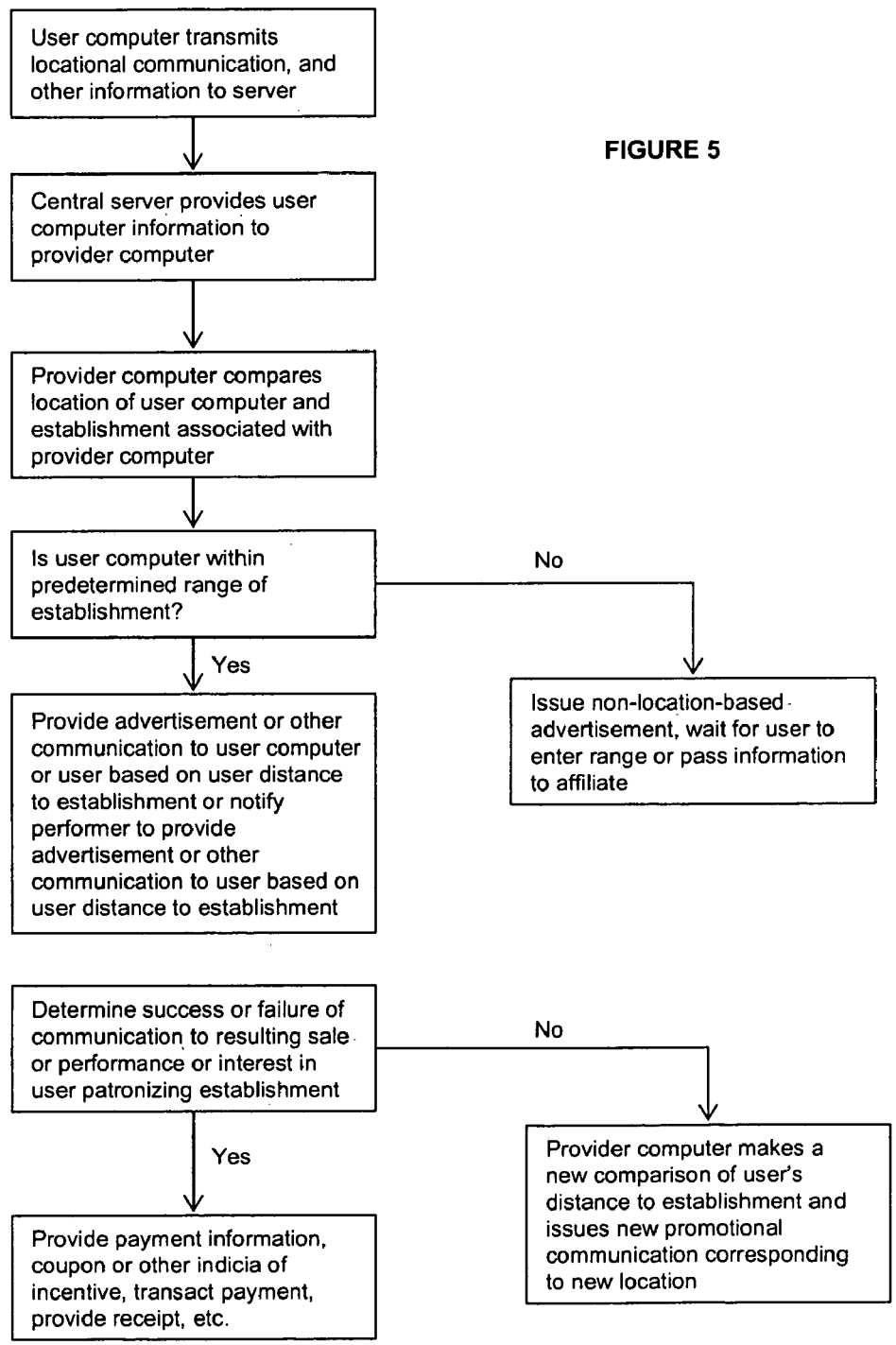
FIG. 5 is a flowchart illustrating another preferred embodiment of the present invention, wherein a central server transmits user information to the provider computers.

In other preferred embodiments, with reference to FIG. 5, the user computer transmits user computer location information to a central server. The command server provides the user computer location to one or more provider computers. In some preferred embodiments provision of such data and/or other user computer data, including, without limitation, data required for the establishment of communication with the user computer and/or the user, including, without limitation, ISP data, cellular telephone number(s), etc., user data, preferences regarding performers, performance types, cost, etc., on-board navigation systems, etc., is provided for a fee via a subscription service, in association with an affiliate marketing program or in exchange for some other valuable consideration. After receiving user computer location information and/or other data from the central server, a provider computer compares the location of the user computer and one or more establishments associated with the provider computer and determines if the user computer is within a predetermined distance from one or more of said establishments associated with the provider computer. If the user computer is within said range, an advertisement or other promotional communication is transmitted to the user computer. If user is not within said range, a non-location based advertisement is issued to the user, and the provider computer 'waits' for the user to enter the predefined range by reassessing the distance of the user computer.

Among other benefits the invention, some preferred embodiments of the instant invention address a long felt need in the entertainment industry to provide "adults-only" communications, promotions, performances and other material to adult drivers and passengers of vehicles. At any point in the process the user may be determined to be an adult via any suitable age verification means, such as by the receipt by the provider computer, central computer or a performer of a credit card number, digital age identification, age or age/identification-associated biometric data, or an age verifying pin number, such as those issued by the online age verification services known as Cyberage® and Adult Check®, or any suitable combination of means. Once such adult age verification has been accomplished, the provider computer and/or performer may provide promotional communications and/or performances which are appropriate for adults and/or are inappropriate for minors (such as sexually explicit language, images and tactile information, online gaming, and other communications). Such adults-only communications may be limited to distribution to users in specified or limited locations, for example, to assist the establishment and/or performer in complying with contemporary community standards regarding such communications, via the use of the system disclosed and claimed in U.S. Pat. No. 6,154,172, to Piccionelli et al.

In some preferred embodiments, the advertisement transmitted depends upon the distance the user computer is from one or more of said establishment. In further embodiments, at that point, one or more performers are notified, via signaling, paging, telephonic communication, etc., and said performer or performers transmit live promotional communications to the user via the user computer or other communication means, including without limitation, via cellular telephone call. In some preferred embodiments, the success or failure of the promotional communications with the user computer and/or the user is reported to the provider computer. In some preferred embodiments, when the promotional communications succeeds in generating a sale of a performance or admission to the establishment or similar user commitment, transactional data, such as a discount coupon or sales receipt may be transmitted to the user computer or to another location. In some preferred embodiments, when the promotional communications fails to generate a sale of a performance, user interest in patronizing the establishment or similar commitment, subsequent promotional communications is transmitted to the user and/or user computer, whereby the nature, type, tone and/or value of the offer may correlate or otherwise be related to the distance of the user and/or user computer to the establishment.

With further reference to FIG. 5, in some preferred embodiments, when the user computer is not within said range of a first establishment, the provider computer may compare the user computer location to the location of one or more affiliated establishment locations. At that point, the provider computer may contact an affiliate provider computer associated with the affiliate establishment and transmit user computer data so that said affiliate provider computer and/or a performer or a plurality of performers may transmit promotional communications with the user computer and/or user in the manner set forth above. In some preferred embodiments, the establishment associated with the provider computer may charge a fee or receive valuable consideration for such transfer of user computer and/or user information, which may include, without limitation, a portion of the fee charged by the affiliate and/or affiliate performer(s) for the providing of performances and/or other goods and/or services to the user.

In some preferred embodiments, the providing of promotional communications advertisements and/or performances may be preceded by a procedure to ascertain the age appropriateness of the user to receive said communications, advertisements, promotions and/or performances, and/or the age appropriateness of others in proximity to the user, such as passengers in the user's automobile. In some preferred embodiments, such age ascertainment and/or verification may be accomplished, without limitation, by one or more of the following means: receipt of credit card or debit card information, pin number or other identification numbers associated with previous age ascertainment, identification database correlation, biometric means, such as fingerprint, retinal and/or voice print assessment, digital signature means, and/or other digital means recognized as a lawful means of ascertaining age appropriateness for the receipt of age restricted communications, services and/or goods.

Systems and apparatus for implementing the foregoing inventive methods can include, for example, computers, wireless laptop computers, servers, telephone paging devices, cellular telephones, personal digital assistants and other mobile computers, digital devices integrated into automobiles, trucks, other vehicles, eyeglasses, personal stereos, wrist watches, and the like. Although the foregoing described invention with preferred embodiments, this is not intended to limit the invention. Rather, the foregoing is intended to cover all modifications and alternative constructions falling within the spirit and scope of the invention.

What is claimed is:

1. A method for communicating with a performer on a network having a provider computer and a user computer, the provider computer and the user computer communicating there between, and wherein the performer provides at least one of an audio and video performance by a performer in real time, comprising:

accessing a user interface via the user computer, wherein the user interface includes data related to at least one performer;

selecting the performer from the user interface to provide at least one of said audio and video performance;

transmitting a request to provide the at least one of said audio and video performance in real time as a response to the request;

receiving data for playing the at least one of said audio and video representation of the performance over the network with the user computer in response to the request; wherein the data is for playing at least one of an audio and video representation of the performance that was performed in real time in response to the request; and providing the provider computer with location information corresponding to a geographic location of the user computer and receiving by the user computer a communication over the network, the communication comprising an incentive having a value to a user of the user computer to visit a specified business establishment; wherein the incentive value is dependent upon a relative distance between the geographic location of the user computer and the specified business establishment.

2. A method as claimed in claim 1, further comprising selecting the performer and requesting the performer to provide at least one of said audio and video performance occurs simultaneously.

3. A method as claimed in claim 1, further comprising selecting said at least one of said audio and video performance from a menu of audio and video performances offered by the performer.

4. A method as claimed in claim 1, further comprising transmitting, by the user computer, predefined user criteria, and transmitting an interface to the user computer from the provider computer dependent upon the predefined user criteria.

5. A method as claimed in claim 4, wherein the predefined user criteria consists of any of from the following group: geographic areas of interest, performer identity, attributes of performers, type of performance, geographic location of performers, cost of performance, type of establishment, and geographic location of establishments.

6. A method as claimed in claim 1, wherein accessing a user interface comprises accessing a website in an on-line communication session over the network, and wherein the selected at least one of said audio and video performance comprises an on-line performance performed by the performer in real time during the on-line communication session, in response to request.

7. A method as claimed in claim 1, wherein the incentive value is greater for a first geographic location of the user computer than for a second geographic location of the user computer, wherein the first geographic location of the user computer is further from the specified business establishment than the second geographic location of the user computer.

8. A method for operating a provider computer to provide performance data to a user computer on a network, the method comprising:

receiving a request from the user computer, the request corresponding to at least one performer;

generating electronic data corresponding to a live performance performed by at least one performer in response to the request;

transmitting the electronic data to the user computer over the network; and receiving with the provider computer location information corresponding to a geographic location of the user computer and providing the user computer with a communication over the network, the communication comprising an incentive having a value to a user of the user computer to visit a specified business establishment within a vicinity of the geographic location of the user computer, wherein the incentive value is dependent upon a relative distance between the geographic location of the user computer and the specified business establishment.

9. A method as claimed in claim 8, wherein receiving a request from the user computer comprises:

providing the user computer with data over the network, the data corresponding to a plurality of performers; and receiving an electronic communication from the user computer over the network, the electronic communication specifying at least one performer.

10. A method as claimed in claim 8, wherein generating electronic data corresponding to a live performance comprises recording a live performance with at least one of an audio or video recording device.

11. A method as claimed in claim 8, wherein receiving a request comprises receiving data from the user computer, the data corresponding to at least one performer and at least one user-selectable attribute of a performance and wherein generating electronic data corresponding to a live performance comprises recording a live performance performed by the at least one performer and including the at least one user-selectable performance attribute.

12. A method as claimed in claim 8, wherein generating electronic data corresponding to a live performance comprises:

notifying the at least one performer of the receipt of the request from the user;

providing a performance recording location at which the at least one performer may perform the requested performance;

recording a live performance by the at least one performer at the performance recording location with an electronic recording system to generate the electronic data.

13. A method as claimed in claim 12, wherein the specified business establishment includes the performance recording location.

14. A method as claimed in claim 8, wherein the incentive value is greater for a first geographic location of the user computer than for a second geographic location of the user computer, wherein the first geographic location of the user computer is further from the specified business establishment than the second geographic location of the user computer.

15. A method as claimed in claim 8, wherein receiving a request from a user computer comprises providing a website in an on-line communication session over the network, and wherein transmitting electronic data comprises transmitting an on-line performance performed by the performer in real time during the on-line communication session, in response to request.

* * * * *